United States Patent [19]
Fornoff et al.

[11] 3,988,129
[45] Oct. 26, 1976

[54] PROCESS FOR REMOVING SULFUR DIOXIDE FROM GAS STREAMS

[75] Inventors: Louis L. Fornoff, Cedar Grove, N.J.; John J. Collins, Katonah; Raymond A. Reber, Montrose, both of N.Y.

[73] Assignee: Union Carbide Corporation, New York, N.Y.

[22] Filed: Dec. 16, 1974

[21] Appl. No.: 533,350

[52] U.S. Cl. .................................. 55/33; 55/62; 55/73
[51] Int. Cl.² .................................. B01D 53/04
[58] Field of Search ............... 55/33, 73, 74, 75, 62; 423/522, 533, 539

[56] References Cited
UNITED STATES PATENTS

| | | | |
|---|---|---|---|
| 3,511,027 | 5/1970 | Roberts et al. | 55/73 X |
| 3,712,027 | 1/1973 | Hasz | 55/33 |
| 3,713,272 | 1/1973 | Barrere, Jr. | 55/33 |
| 3,772,854 | 11/1975 | Tamura | 55/74 X |
| 3,808,773 | 5/1974 | Reyhing et al. | 55/75 X |
| 3,829,560 | 8/1974 | Fornoff et al. | 423/522 |
| 3,836,630 | 9/1974 | Noguchi et al. | 423/522 X |

*Primary Examiner*—Theodore A. Granger
*Attorney, Agent, or Firm*—Richard G. Miller

[57] ABSTRACT

In the prevention of atmospheric pollution by sulfur dioxide emissions from acid absorbers in contact process sulfuric acid plants in which the unconverted $SO_2$ is accumulated by adsorption in a zeolite adsorbent bed and desorbed back into the acid production system, it is found that ambient moist air, after partial dehydration in an acid scrubber is suitably used both to cool down and hot purge desorb the zeolite beds. In addition the pure water derived from the ambient air is advantageously used in the acid-making system.

1 Claim, 1 Drawing Figure

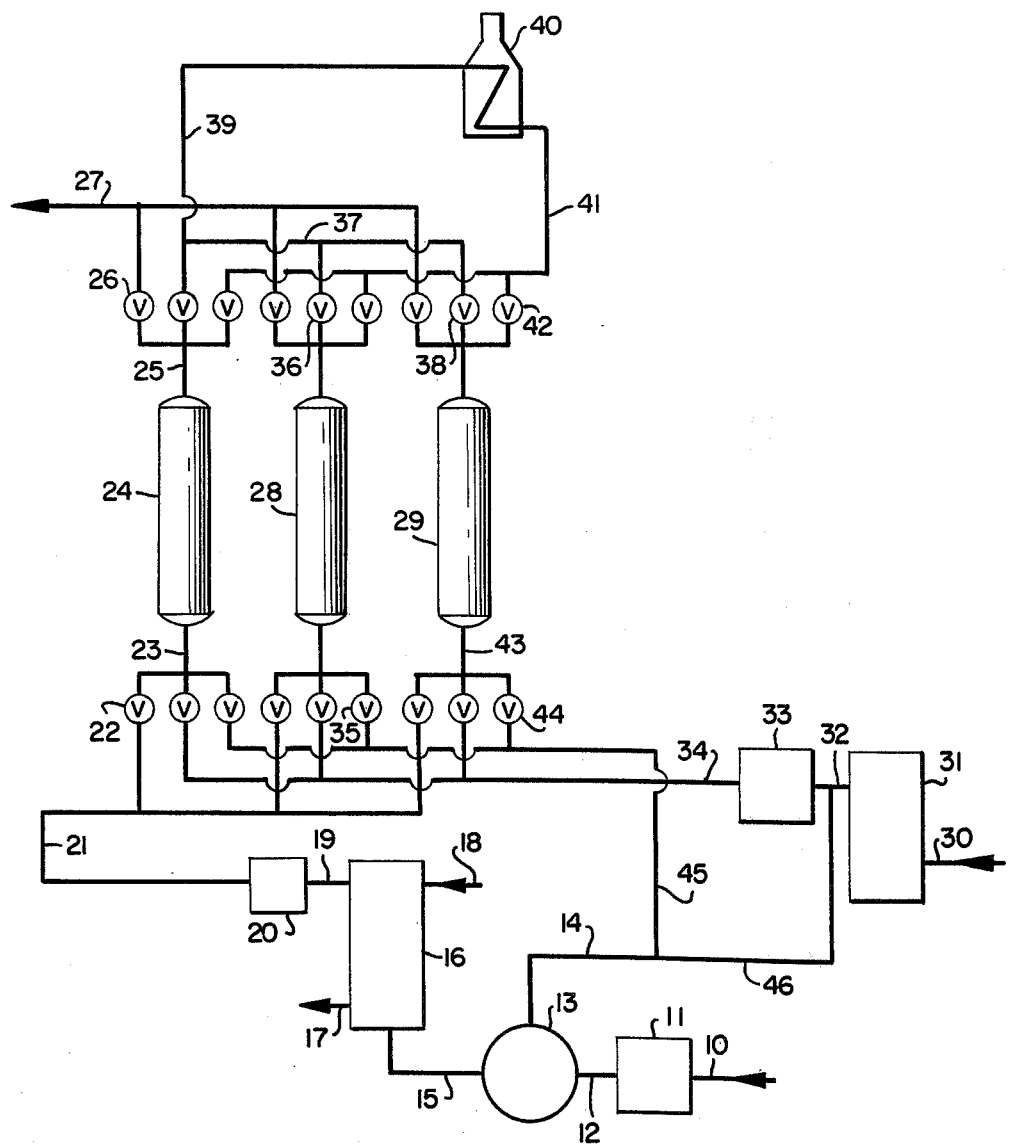

PROCESS FOR REMOVING SULFUR DIOXIDE FROM GAS STREAMS

The present invention relates in general to the method for removing sulfur dioxide from gas streams and more particularly to an improved process for recovering sulfur dioxide emissions from acid absorber towers in contact process sulfuric acid plants and recycling same to a point up-stream of a contact process catalytic converter.

In the contact process for the production of sulfuric acid, a gas stream containing sulfur dioxide and free oxygen is converted by contact with a catalyst according to the strongly exothermic reaction $$2 SO_2 + O_2 \rightleftharpoons 2 SO_3$$

Generically, sulfuric acid plants in which sulfur dioxide and oxygen are converted to sulfur trioxide in contact with a solid catalyst are contact processes whether or not the sulfur dioxide production is integrated with the particular plant. In those cases in which sulfur dioxide is formed by burning elemental sulfur, metal sulfides, hydrogen sulfide or carbonaceous sludges of spent sulfuric acid, it is common practice to have these combustions thermally integrated with the process for converting sulfur dioxide to sulfuric acid. Copper converter gas, smelter and various sulfate decomposition by-product gases and sulfur dioxide itself are examples of off-site production processes not thermally integrated into the sulfuric acid production process.

The catalyst employed in the converter in the contact process is either a platinum or a vanadium based composition since these are the only known materials providing commercially feasible conversion rates. At present the most commonly used are the vanadium based materials which are complex compositions containing vanadium in the oxidation state corresponding to vanadium pentoxide ($V_2O_5$). Depending upon the particular catalyst mass employed and the composition of the $SO_2$-containing feed stream, the converter can comprise one or a plurality of stages operated at various temperature conditions to achieve optimum $SO_3$ production. In the converter the reaction $$2 SO_2 + O_2 \rightleftharpoons 2 SO_3$$

can be made to go almost, but not completely, to the sulfur trioxide product side at temperatures of below 700° F. at very slow reaction rates. Higher temperatures increase the reaction rates, but the reaction equilibrium is shifted toward increasing concentrations of sulfur dioxide. In the commercial practice of the contact process the economic balance between increasing the reaction rate and decreasing the equilibrium toward the sulfur trioxide product side of the reaction is the controlling factor with the result that the effluent gas from the catalytic conversion stage has an appreciable content of sulfur dioxide. In practice the entire gas stream effluent from the converter is passed upwardly through an acid absorber tower in which water reacts with the $SO_3$ to form $H_2SO_4$. The $SO_2$, however, passes through the acid absorber, and exits in the vent gas from the sulfuric acid plant as an impurity and lost sulfur reactant, or the effluent from the scrubber is fed to another catalytic converter to convert some of the $SO_2$ to $SO_3$ and consequent production of additional sulfuric acid in another acid adsorber. In this latter case, the emission and loss of $SO_2$ into the atmosphere via the plant vent gas is still several hundred parts per million.

Heretofore it has been proposed to remove sulfur dioxide from sulfuric acid plant vent gas by selective adsorption in a zeolitic molecular sieve bed and recycle the thus accumulated $SO_2$ as feedstock to a catalytic converter for the production of $SO_3$ and ultimately sulfuric acid. That proposed process is set forth in detail in U.S. Pat. No. 3,829,560 issued Aug. 13, 1974.

It has now been found that the aforesaid earlier proposed process can be substantially improved by means of the highly efficient process of the present invention for adsorbing and recovering sulfur dioxide from the absorber tower effluent gas stream which makes multiple use of the zeolite adsorbent beds and provides, as a highly desirable by-product, pure water for use in the sulfuric acid synthesis. Accordingly, in the process for removing sulfur dioxide from a gas stream comprising sulfur dioxide, water, nitrogen and oxygen wherein said gas steam is treated in an adsorption system comprising at least three fixed beds of activated crystalline zeolitic molecular sieve adsorbent, each of said three fixed beds cyclically undergoing the sequential steps of (a) adsorption, whereby the said gas stream is passed thereinto at a temperature of from 10° C to 50° C and sulfur dioxide and water are selectively adsorbed therein, (b) desorption wherein air containing less than 5 ppm water vapor and at a temperature of from 150° to 350° C. is passed as a purge gas countercurrently therethrough to desorb sulfur dioxide and water and flush same from the bed, and (c) cooldown wherein an air stream at a temperature of from 0° to 60° C. and containing less than 200 ppm water vapor is passed cocurrently, with respect to the direction of flow during the adsorption step, through said bed (the cyclic operation of the beds in the system being such that at some given time each of the said three beds is undergoing a different one of the said steps than the other two beds) the present invention provides the improvement which comprises preparing the air stream employed in step (c) by passing ambient, i.e. atmospheric air containing more than 200 ppm water vapor by volume through a sulfuric acid scrubber to reduce the water vapor content thereof to between 10 and 200 ppm by volume and using the effluent air stream from the bed undergoing step (c) to desorb the bed undergoing step (b), said effluent air stream being dehydrated to contain not more than 5 ppm water vapor by volume by passage through the said bed undergoing step (c).

The process of this invention is described in greater detail and illustrated by the following description in conjunction with the drawing. The drawing is a schematic flow diagram showing a particular embodiment of the present process wherein three molecular sieve adsorbent beds are used to adsorb the sulfur dioxide from the acid adsorber of a contact process sulfuric acid plant.

With reference to the drawing, sulfuric acid is manufactured by feeding sulfur and sufficient dry air to provide a substantial stoichiometric excess of oxygen through line 10 into furnace 11 wherein combustion occurs to produce sulfur oxides, principally $SO_2$. The combustion products and residual nitrogen and oxygen leave the furnace 11 through line 12 and enter catalytic converter 13 which contains a vanadium based catalyst at elevated temperature. Also entering converter 13 through line 14 is a gas stream containing oxygen, sulfur dioxide and nitrogen, the origin of which is provided infra. The effluent from converter 13 is essentially $SO_3$, oxygen, nitrogen and a relatively small quantity of unconverted $SO_2$. This effluent is conducted through line 15 to acid absorber 16 wherein the $SO_3$ is contacted with aqueous sulfuric acid and is converted to sulfuric acid by reaction with water. Product sulfuric acid is removed from the acid absorber through line 17 and make-up acid is added through line 18. The gaseous effluent from acid absorber 16 is composed of oxygen, nitrogen, sulfur dioxide and water vapor and has entrained therein small droplets of sulfuric acid. These droplets are substantially removed in demister apparatus 20 after the effluent from acid absorber 16 has passed through line 19. From demister 20 the gas stream is passed through manifold 21, valve 22, and line 23 into adsorption bed 24 which contains activated zeolitic molecular sieve crystals as the adsorbent. Substantially all of the water and sulfur dioxide are adsorbed in bed 24 and the non-adsorbed constitutents, i.e. oxygen, nitrogen and trace quantities of sulfur dioxide and water vapor are conducted out of bed 24 through line 25, valve 26 and then vented to the atmosphere through line 27. In addition to bed 24 the adsorption system contains two additional adsorption beds of essentially the same adsorption capacity as bed 24. These beds are identified in the drawing by reference numbers 28 and 29 respectively. By appropriate valve means shown in the drawing, the effluent gas stream from demister 20 passing through manifold 21 can be fed to each of the three adsorption beds 24, 28 and 29 in turn so that when the adsorption stroke in one bed is completed one of the other beds in the system which has been regenerated by desorption and cool-down can be placed in fluid communication with manifold 21 and the adsorption purification of the gas stream passing through manifold 21 continued without interruption. Thus during the period in which bed 24 is undergoing an adsorption stroke, bed 29 is undergoing a countercurrent desorption using a hot dry purge gas and bed 28 is undergoing a cocurrent cool-down following a similar hot purge desorption so that bed 28 will be in condition to begin an adsorption stroke at the termination of the adsorption stroke in bed 24. Assuming the steps of adsorption, desorption (hot purge) and cool-down are of equal duration, the operation of the three bed system can be represented graphically as follows:

| Adsorber No. | Cycle Step | | |
|---|---|---|---|
| 24 | Adsorption | Hot Purge | Cool Purge |
| 28 | Cool Purge | Adsorption | Hot Purge |
| 29 | Hot Purge | Cool Purge | Adsorption |

It is surprisingly found that the gas used to cool-down the adsorption beds in the present system need not be as free of water vapor as heretofore supposed. In fact water vapor concentrations in this cooldown gas can be any amount which does not exceed 200 ppm by volume. Accordingly, in the present process ambient air, e.i. air taken directly from the atmosphere surrounding the process apparatus and containing more than 200 ppm water vapor is used for purposes of cooldown after being dehydrated to contain less than 200 ppm water vapor by passage through a scrubber containing a concentrated aqueous solution of sulfuric acid. The concentrated sulfuric acid should be from 90 to 99 per cent by weight $H_2SO_4$ and is preferably at least 93 wt.-% $H_2SO_4$. The operating temperature of the acid scrubber should be such that the temperature of the air stream effluent therefrom does not exceed 60° C. With reference to the drawing, ambient air containing more than 200 ppm (vol.) water vapor is introduced into the system through line 30 and is passed through scrubber 31 containing 93 per cent sulfuric acid. The air stream leaving the scrubber contains not more than 200 ppm (vol.) water vapor, typically 50 to 100 ppm, and is passed via line 32 to demister apparatus 33 to remove entrained sulfuric acid droplets. From the demister apparatus the gas stream is fed into bed 28 through line 34 and valve 35. The gas stream effluent from bed 28 through valve 36 during this cooldown step contains and preserves the heat energy transferred from the bed and contents and can, if its temperature is between 150° and 350° C., be passed through manifold 37 and valve 38 directly to bed 29, which is undergoing hot purge desorption. If it is necessary to raise the temperature of this gas stream to within the range of 150° to 350° C., it is directed from manifold 37 through line 39, furnace 40, line 41 and valve 42 to bed 29. By virtue of of having passed through bed 28, the gas stream contains less than about 5 ppm water vapor and as a result is sufficiently dry to be used as the hot purge gas in desorbing the $SO_2$ and water from bed 29. The effluent from bed 29 contains $SO_2$, $H_2O$, $N_2$ and $O_2$. It is desirable to maintain a ratio of oxygen to $SO_2$ in this effluent which permits efficient operation of the catalyst mass in converter 13. The optimum oxygen to $SO_2$ ratio is dependent upon a number of factors such as the particular catalyst used in the converter, the temperature of the catalyst mass, and the like and thus cannot be stated with mathematical precision. The optimum ratio can readily be determined, however, by routine methods for any given process system. Since, however, the desorbate emission from a purge desorbed bed is not constant over the whole desorption period, the effluent stream leaving bed 29 through line 43, valve 44 and line 45 can be altered with respect to oxygen content by air enrichment through line 46 prior to entering converter 13.

Although the foregoing illustration employed three adsorbent beds any number of beds can theoretically be employed to optimize some particular feature of the process internally or relative to the sulfuric acid plant. In the practical sense, however, no more than 7 beds would ordinarily be employed. An examplary case for a four adsorber process would provide that two adsorbers would be on the adsorption step of their cycles simultaneously according to the following cycle program.

| Adsorber No. | Cycle Step | | |
|---|---|---|---|
| 1 | Adsorption | Hot Purge | Cool Purge |
| 2 | Cool Purge | Adsorption | Hot Purge |
| 3 | Hot Purge | Cool Purge | Adsorption |

-continued

| Adsorber No. | Cycle Step | | | |
|---|---|---|---|---|
| 4 | Adsorption | Hot Purge | Cool Purge | Adsorption |

Thus according to this program, there are two adsorbers on adsorption at any time. Having two adsorbers in parallel on adsorption so that the acid adsorber tail gas stream may be divided permits the use of smaller adsorption beds, since only half the tail gas stream flow rate need be designed for.

Another exemplary case for a four adsorber system may have the following cycle program.

| Absorber No. | Cycle Step | | | |
|---|---|---|---|---|
| 1 | Adsorption | | Hot Purge | Cool Purge |
| 2 | Cool Purge | Adsorption | | Hot Purge |
| 3 | Hot Purge | Cool Purge | Adsorption | Hot Purge |
| 4 | | Hot Purge | Cool Purge | Adsorption |

In this program, there are two adsorbers on hot purge desorption at any time. Among the advantages found for this program are that the temperature and desorbed $SO_2$ content of the desorption effluents are blended to average values in the gas stream returning the $SO_2$ to the sulfuric acid plant.

An exemplary case for a five adsorber system may have the following cycle program.

| Adsorber No. | Cycle Step | | | |
|---|---|---|---|---|
| 1 | Adsorption | | Hot Purge | Cool Purge |
| 2 | Cool Purge | Adsorption | | Hot Purge |
| 3 | Hot Purge | Cool Purge | Adsorption | Hot Purge |
| 4 | Hot Purge | | Cool Purge | Adsorption |
| 5 | Adsorption | Hot Purge | Cool Purge | Adsorption |

This program combines the advantageous features of both of the four bed programs.

In each of the exemplary programs an essential feature of the PuraSiv S process is followed which is that each adsorber is sequentially positioned for the steps of adsorption, hot purge desorption and cool purge cooldown.

The crystalline zeolitic molecular sieve employed in the $SO_2$ adsorption beds can be any which has a pore diameter large enough to adsorb $SO_2$, i.e., at least 4 Angstroms. Preferably, the zeolite has a high capacity for $SO_2$ and is resistant toward crystal degradation by contact with acids. Illustrative of the molecular sieves suitably employed are zeolite A, U.S. Pat. No. 2,882,243; zeolite X, U.S. Pat. No. 2,882,244; zeolite R, U.S. Pat. No. 3,030,181; zeolite S, U.S. Pat. No. 3,054,657; zeolite T, U.S. Pat. No. 2,950,952; zeolite F, U.S. Pat. No. 2,996,358; zeolite B, U.S. Pat. No. 3,008,803; zeolite Q, U.S. Pat. No. 2,991,151; zeolite M, U.S. Pat. No. 2,995,423; zeolite H, U.S. Pat. No. 3,010,789; zeolite J, U.S. Pat. No. 3,011,809; zeolite Y, U.S. Pat. No. 3,130,007; zeolite L, U.S. Pat. No. 3,216,789; zeolite K-G, U.S. Pat. No. 3,056,654 and synthetic mordenite. Naturally occurring zeolites suitably employed are chabazite, gmelinite, mordenite, erionite, offretite, clinoptilolite, phillipsite and faujasite. The foregoing zeolites can be utilized in the cation form in which they are produced synthetically or occur naturally or in their cation exchanged or decationized forms well known in the art.

Although the present invention has been described hereinbefore in conjunction with the operation of a sulfuric acid plant, it is to be understood that any gas stream containing sulfur dioxide as an impurity and in which the bulk of the gas stream is less strongly sorbed on molecular sieve zeolites than the sulfur dioxide, can be treated by the process of this invention.

What is claimed is:

1. In the process for removing sulfur dioxide from a gas stream comprising sulfur dioxide, water, nitrogen and oxygen wherein said gas stream is treated in adsorption system comprising at least three fixed beds of activated crystalline zeolitic molecular sieve adsorbent, each of said three fixed beds cyclically undergoing the sequential steps of
   a. adsorption, whereby the said gas stream is passed thereinto at a temperature of from 10° to 50° C. and sulfur dioxide and water are selectively adsorbed therein.
   b. desorption wherein air containing less than 5 ppm water vapor by volume and at a temperature of from 150° to 350° C. is passed as a purge gas countercurrently therethrough to desorb sulfur dioxide and water and flush same from the bed,
   c. cooldown wherein an air stream at a temperature of from 0° to 60° C. and containing less than 200 ppm water vapor is passed cocurrently, with respect to the direction of flow during the adsorption step, through said bed, the cyclic operation of the beds in the system being such that at some given time each of the said three beds in undergoing a different one of the said steps than the other two beds the improvement which comprises preparing the air stream employed in step (c) by passing ambient air containing more than 200 ppm water vapor through a sulfuric acid scrubber to reduce the water vapor content thereof to between 10 and 200 ppm by volume and using the effluent air stream from the bed undergoing step (c) to desorb the bed undergoing step (b), said effluent air stream being dehydrated to contain not more than 5 ppm water vapor by volume by passage through the said bed undergoing step (c).

* * * * *